(12) United States Patent
Cull et al.

(10) Patent No.: US 7,117,135 B2
(45) Date of Patent: Oct. 3, 2006

(54) SYSTEM FOR PROVIDING A HIGH-FIDELITY VISUAL DISPLAY COORDINATED WITH A FULL-SCOPE SIMULATION OF A COMPLEX SYSTEM AND METHOD OF USING SAME FOR TRAINING AND PRACTICE

(75) Inventors: Christopher A. Cull, Montreal (CA); Yves Riel, Laval (CA); Pierre Gagnon, Laval (CA); Philippe Boisvert, Notre-Dame des Prairies (CA); Jean Daigle, Dorval (CA)

(73) Assignee: CAE Inc., Saint-Laurent (CA)

( * ) Notice: Subject to any disclaimer, the term of this patent is extended or adjusted under 35 U.S.C. 154(b) by 812 days.

(21) Appl. No.: 10/143,868

(22) Filed: May 14, 2002

(65) Prior Publication Data

US 2003/0214533 A1 Nov. 20, 2003

(51) Int. Cl.
    *G06G 7/48* (2006.01)
(52) U.S. Cl. .................... 703/6; 700/118; 345/419
(58) Field of Classification Search .............. 703/6, 703/1; 345/419, 426, 427; 700/118, 95, 700/100, 114, 115
    See application file for complete search history.

(56) References Cited

U.S. PATENT DOCUMENTS

| 5,286,202 A | 2/1994 | deGyarfas et al. ............ 434/43 |
| 5,326,270 A | 7/1994 | Ostby et al. ................. 434/362 |
| 5,345,554 A | 9/1994 | Lippincott et al. .......... 395/162 |
| 5,548,345 A | 8/1996 | Brian et al. .................. 348/734 |
| 5,550,575 A | 8/1996 | West et al. .................. 348/5.5 |
| 5,651,676 A | 7/1997 | Artwick ........................ 434/43 |
| 5,919,046 A | 7/1999 | Hull ............................ 434/258 |
| 6,007,338 A | 12/1999 | DiNunzio et al. ............ 434/55 |
| 6,128,019 A | 10/2000 | Crocker, III et al. ........ 345/419 |
| 6,236,408 B1 | 5/2001 | Watkins ....................... 345/433 |
| 6,331,861 B1* | 12/2001 | Gever et al. ................. 345/629 |
| 6,362,818 B1 | 3/2002 | Gardiner et al. ............ 345/421 |
| 6,404,436 B1* | 6/2002 | Goden ......................... 345/473 |
| 6,425,764 B1* | 7/2002 | Lamson ....................... 434/236 |
| 6,563,520 B1* | 5/2003 | Parker et al. ............... 715/771 |

FOREIGN PATENT DOCUMENTS

| GB | 2 256 568 A | 12/1992 |
| WO | WO 97/00106 | 1/1997 |

OTHER PUBLICATIONS

Presentation to ACATS Conference, Hong Kong-Simulation-Based Distance Learning, Oct. 5-6, 2000.
Presentation to American Eagle Conference, Dallas- Simulation Based Distance Learning, Feb. 16, 2001.
Presentation-CAE Simfinity, Aug. 28, 2001.
Presentation to IATA Conference, Oklahoma City-Internet Simulation Training: Computer-Based Instruction, Aug. 29, 2001.

(Continued)

*Primary Examiner*—Albert W. Paladini
(74) *Attorney, Agent, or Firm*—Ogilvy Renault LLP (57) ABSTRACT

Control panels of a simulated complex system are displayed as a texture mask over a three-dimensional visual representation of an environment in which the complex system is operating. The three-dimensional visual representation is displayed in an inactive window to a user practicing or training on the simulated system. An active window underlying the visual display is used to track user inputs to the control panels. Smart graphics translate the user inputs into data elements that are sent to a full-scope simulation, and simulation conditions are returned and used to update the display of the control panels and the visual representation of the environment.

35 Claims, 8 Drawing Sheets

OTHER PUBLICATIONS

Presentation to WICAT Conference, Utah-Better, Faster, Cheaper, Sep. 3-6, 2001.

Presentation to RATS Conference, Orlando, Florida- Simulation-Based Distance Learning, Mar. 5-6, 2002.

Article, Flyer Magazine entitled "Training As Real as it Gets", Tom Benenson, Jun. 2001.

Flyer entitled "Distributed Tactics and Mission Training-Anywhere, Anytime"—ITIC, Lille, Apr. 24-26, 2001.

Marketing material entitled "The CAE AirBook™ " with the SIMIGON logo-ITIC, Lille, Apr. 24-26, 2001.

Article "Migration of an Engineering Design Simulator to the High level Architecture", Givens et al., 1997 Aerospace and Electronics Conference, IEEE 1997.

Article "An ADA-Based, Portable Design Workstation for Computer-Generated Cockpit Displays" Turner et al., $9^{th}$ Digital Avionics Systems Conference, 1990, IEEE 1990.

* cited by examiner

SYSTEM FOR PROVIDING A HIGH-FIDELITY VISUAL DISPLAY COORDINATED WITH A FULL-SCOPE SIMULATION OF A COMPLEX SYSTEM AND METHOD OF USING SAME FOR TRAINING AND PRACTICE

CROSS-REFERENCE TO RELATED APPLICATIONS

This is the first application filed for the present invention.

MICROFICHE APPENDIX

Not applicable.

TECHNICAL FIELD

The invention relates in general to the simulation of complex systems for the purpose of system and integrated procedure training and practice and, in particular, to a method and apparatus for providing complex system simulation in which interactive graphics representing control panels of a simulated complex system are merged with real-time simulated three-dimensional imagery of an environment in which the simulated complex system is being operated.

BACKGROUND OF THE INVENTION

The complexity of systems used in many human endeavors has increased to a point that extensive training is required for safe operation and maintenance. Training on real systems is particularly problematic in industries that use expensive and/or potentially dangerous equipment. Examples of this equipment include aircraft, ships, submarines, military equipment, nuclear power plants, and a host of other complex systems. It has therefore become standard practice to use simulations of the complex systems for training. In order to faithfully reproduce the behavior of real complex systems, "full-scope" simulation is required. A full-scope simulation is a simulation in which all necessary subsystems are simulated to an extent that the full-scope simulation responds in all relevant conditions, both normal and abnormal, substantially identically to the real system.

In many applications involving a full-scope simulator, a high fidelity visual system is required. These visual systems typically provide a three-dimensional immersive environment for the operator(s). Three-dimensional immersive environments are known to significantly improve the effectiveness of the simulator. The degree of realism provided by a high fidelity visual system is now quite advanced. The level of detail provided by such visual systems requires large visual databases that must be synchronized with the full scope simulator, in order to render the three-dimensional visual scenes in real time. Because of their size and complexity, full-scope simulators that include high fidelity visual systems are typically housed in a special facility, and users are compelled to travel to the facility for training and practice.

Applicant's co-pending patent application entitled METHOD AND APPARATUS FOR SELF-PACED INTEGRATED PROCEDURE TRAINING USING A REAL-TIME, FULL-SCOPE SIMULATION, which was filed on May 7, 2002, the specification of which is incorporated herein by reference, describes how a two-dimensional, vector-based graphical user interface permits a user to interact with a full-scope simulation accessed through a network, such as the Internet. The user interface consists of "smart" graphical objects with which the user interacts. In order to provide a context for a specific application, the smart graphical objects are overlaid on a bitmapped image appropriate for the application.

It has been recognized for some time that in many simulation applications it is advantageous to integrate three-dimensional real-time visual effects into an interactive user interface. This type of environment is essential in applications where an operator needs to familiarize themselves with the out-of-the-window scene, and interpret visual (out-of-the-window) information in order to determine how to respond appropriately to a situation. Simulators that provide varying degrees of visual and simulation fidelity are commercially available. Such simulators permit users to interact with a three-dimensional visual environment using an interface such as a joystick or a keyboard. Examples are Microsoft Flight Simulator 2000® and AirBook™ by Simigon. A disadvantage of such systems is that the user interfaces are not very intuitive, and not directly associated with all simulated systems.

Applicant's above-referenced co-pending patent application, permits a user to learn or practice integrated procedures, and acquire systems knowledge by interacting with the smart graphics in the two-dimensional user interface. The user inputs to the interface are supplied to a full-scope simulation server that reacts in a realistic way to the inputs, and returns simulation condition data that is used, in turn, to update the appearance of the two-dimensional user interface. While this permits the user to learn or practice integrated procedures and acquire systems knowledge, it does not provide the three-dimensional visual environment required for certain training and practice applications. For example, in the airline industry, airport familiarization, familiarizing with low-visibility atmospheric conditions for flying, airport approaches, runway maneuvers and the like require a three-dimensional visual environment.

There is therefore a need for a system that incorporates three-dimensional environment visualization into a fully functional graphical user interface to enable low-cost learning and practice of integrated procedures and operation of a complex system.

SUMMARY OF THE INVENTION

It is therefore an object of the invention to provide a system that incorporates three-dimensional visualization into a fully functional graphical user interface to enable low-cost learning and practice of integrated procedures and operation of a complex system.

It is a further object of the invention to provide a method and apparatus for providing an interactive graphical user interface in which real-time, three-dimensional visual information is seamlessly merged.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention enables a three-dimensional visual environment to be incorporated into an interactive graphical user interface, to support a host of new complex system simulation applications. Those applications apply full-scope simulation with high fidelity visual systems to enable self-paced learning and practice on complex simulated systems. The integration of self-paced courseware for classroom or distance learning is also enabled.

Incorporating a three-dimensional visual environment into an interactive user interface poses significant difficulties. First, because of the size of high fidelity visual system databases, it is currently necessary to keep the visual database local to a client computer that displays the graphical user interface. High fidelity visual system information cannot be reasonably transferred across a network in real time using currently available commercial technology. In addition, extensive, high-speed processing is required to render such databases in real time. This places a significant processing load on the client computer, and requires a graphics acceleration card. Consequently, the full-scope simulation, which also requires extensive, high-speed processing, should ideally be run on another processor, locally or remotely such as a simulation server. This gives rise to a third problem: how to synchronize the three-dimensional rendering with the simulation, while the simulation runs remotely.

As will be explained below in detail, these problems can be overcome by having a local copy of the simulation, the visual database and a local three-dimensional visuals system. Optionally, the processing load on the client can be reduced by having the simulator execute on a remote server. In order to further control the client computer processing load, the refresh rate of the three-dimensional environment is adjusted. Certain of the demanding visual effects can also be disabled, if required, and some of the non-critical details in the visual database can be removed. It should be understood, however, that these optimization techniques are only required in cases in which the client computer does not have adequate processing speed to be able to render the full three-dimension visuals.

Figure 1:
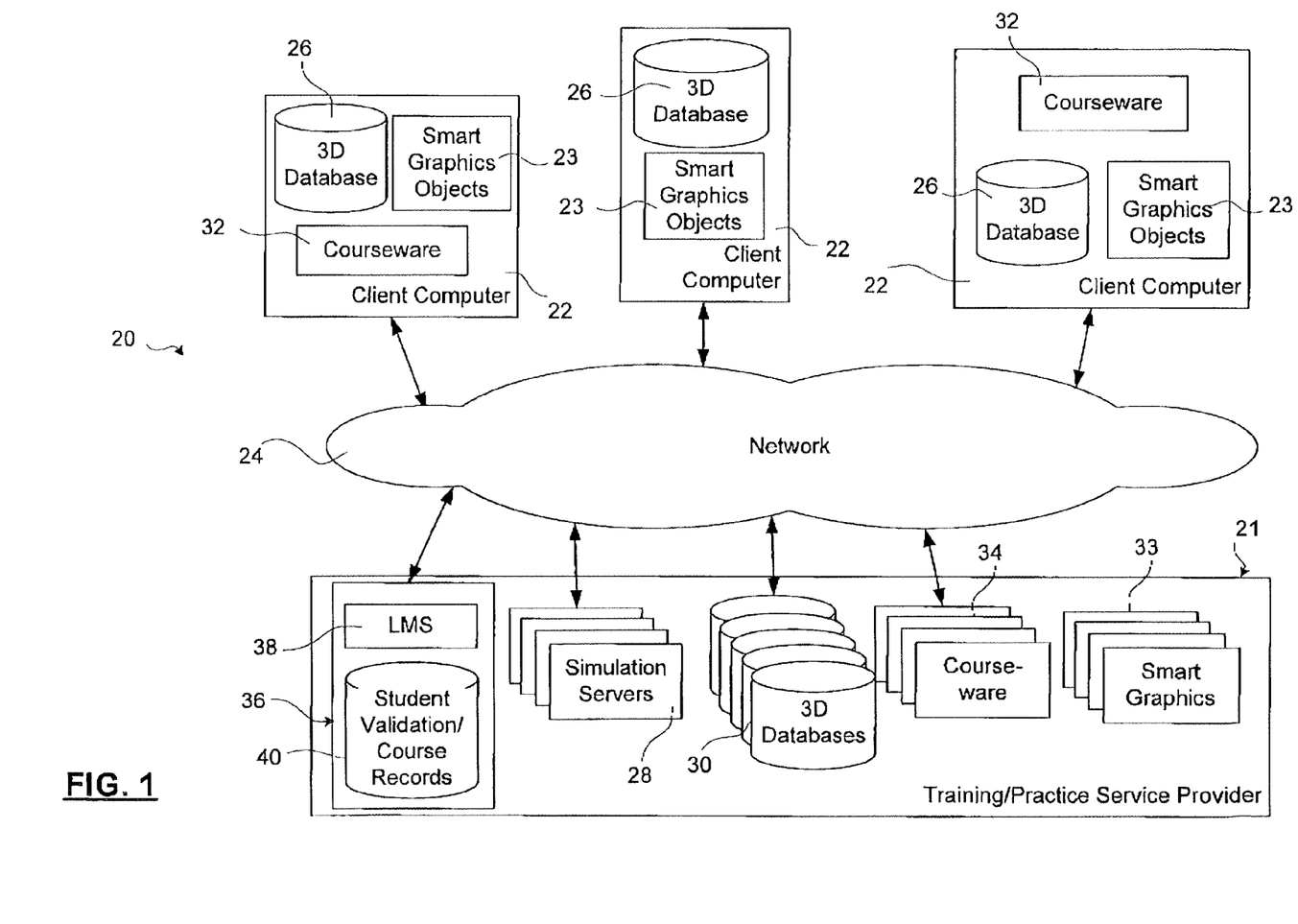
FIG. 1 is a schematic diagram of an overview of one embodiment of a system in accordance with the invention.

FIG. 1 is a schematic diagram of an overview of a system 20 in accordance with the invention. The system 20 includes one or more client computer(s) 22 connected to a network 24, such as a local area network (LAN) metropolitan area network (MAN), wide area network (WAN), or an open network such as an Intranet, or the Internet. Each of the client computers 22 supports a local database 26 of data used to render high fidelity three-dimensional visual effects, in a manner well known in the art. The high-fidelity three-dimensional database may be supplied to the client computer in a number of ways. For example, the content of the database can be downloaded from a remote database 30 from a service provider using electronic commerce, or some other contractual agreement; purchased on a compact disc or a flash memory; or, supplied through some other channel on a computer readable medium. In order to practice the invention, the client computer is connected through the network 24 to a simulation server 28, which may simulate any one of a number of complex systems, like an aircraft, for example.

The system 20 is particularly suited for distance learning or skills practice. As is well known in the art and explained in detail in applicant's above-referenced co-pending patent application, distance learning is facilitated by the use of self-paced courseware. Consequently, the client computer 20 is likewise optionally provisioned with courseware 32, as will be explained below in more detail with reference to FIG. 8. The courseware 32 may be downloaded, along with corresponding smart graphics objects 23 and three-dimensional databases relevant to the courseware, from service provider databases 30, 33, 34, or obtained through any other channel, as explained above with reference to the three-dimensional database 26. Distance learning can be further enhanced by the use of a Learning Management System (LMS) 38, as also explained in detail in Applicant's above-referenced co-pending patent application. The learning management system 38 records, tracks, validates and evaluates students using student validation and course records 40.

Figure 2:
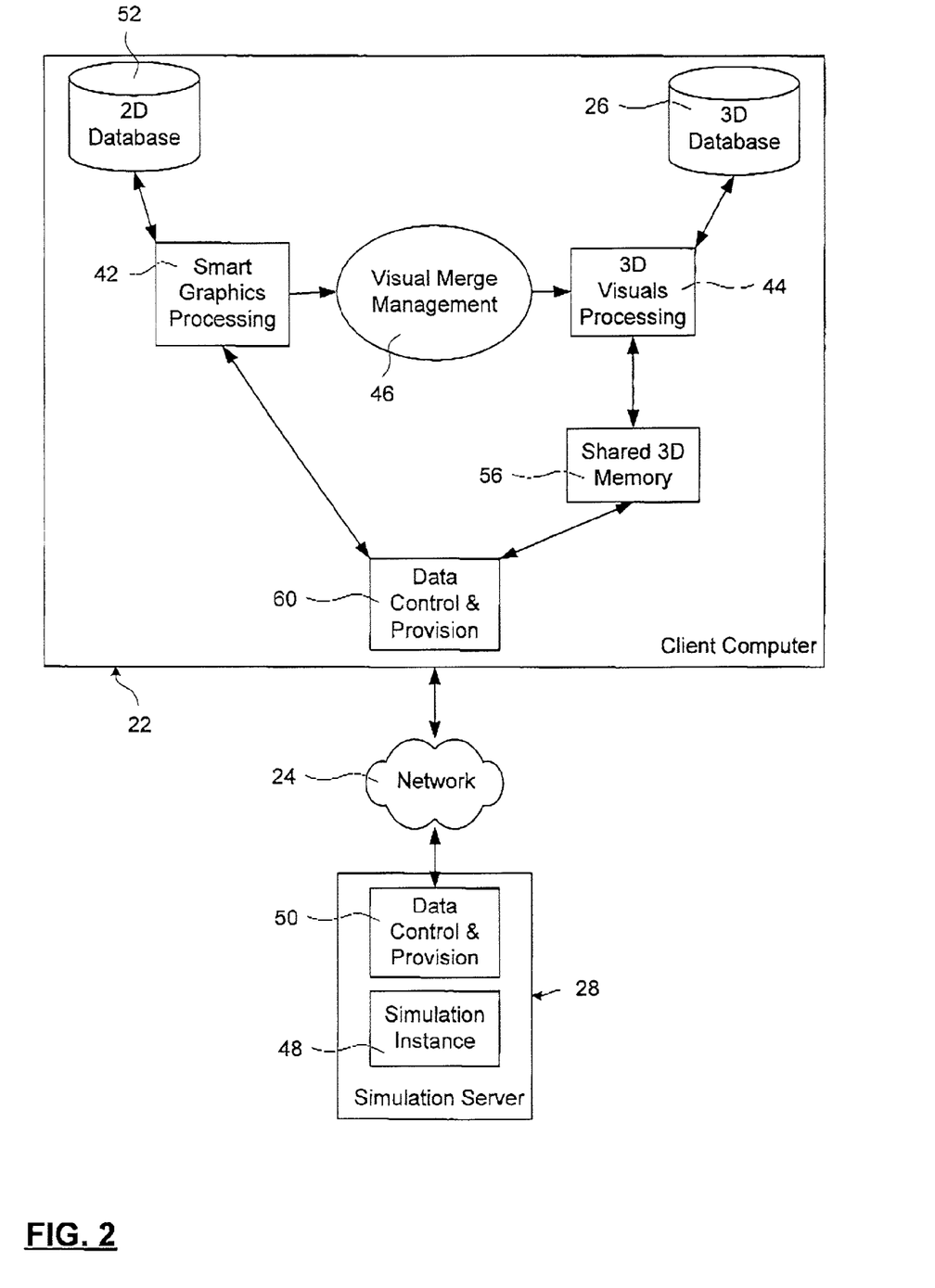
FIG. 2 is schematic diagram of an embodiment of a client/server architecture for implementing the system shown in FIG. 1.

FIG. 2 is a schematic diagram of one embodiment of a client/server architecture for implementing the system shown in FIG. 1. As explained above, the client computer 22 is connected through the network 24 to the simulator server 28 using any suitable communications protocol. The client computer handles graphics processing using smart graphics processing (SGP) 42 programs that retrieve two-dimensional graphics information from a database 52, and three-dimensional visuals (3DV) processing programs 44, which retrieve visual information from the three-dimensional (3-D) database 26. The SPG 42 generates a two-dimensional image containing smart graphics representing virtual controls that can be manipulated by a user of the system 20, in a manner known in the art. The 3DV processing programs generate three-dimensional visuals of an environment surrounding the simulated complex system, also in a manner well known in the art. The SGP 42 and the 3DV 44 are interconnected by a visual merge management (VMM) function 46, as will be explained below in some detail.

The simulation server 28 supports an instance 48 of a full-scope complex system simulation, which exchanges data elements with the client computer 22 through a data control and provision function 50, as explained in detail in Applicant's co-pending patent application SYSTEM AND METHOD FOR DISTANCE LEARNING OF SYSTEMS KNOWLEDGE AND INTEGRATED PROCEDURES USING A REAL-TIME, FULL-SCOPE SIMULATION, which was filed on May 7, 2002, the specification of which is likewise incorporated herein by reference. Although the processing load is divided between the client computer 22 and the server computer 28, there is still a significant barrier to overcome. In order to integrate the high fidelity visual display, a single view that incorporates both the interactive smart graphics and the three-dimensional visuals must be presented to the user.

As shown in FIG. 2, both the SGP 42 and the 3DV 44 interact with the simulation instance 48, to ensure that user inputs to the smart graphics are passed to the simulator and that simulator conditions update visual displays generated by both the SGP 42 and the 3DV 44 programs. The user views both, but interacts only with the smart graphics that represent switches, dials, levers and other control interfaces on the displayed representations of the control panels and displays. In the two-dimensional graphical user interface, a bitmap is used to provide context for vector-based smart graphics. In order to create one view, both graphical environments are overlaid in a way that permits an appropriate portion of each environment to be presented to the user (i.e.—the simulated environment appears through windows of the simulated complex system, and smart graphics appear on the bitmap of the simulated control panels and displays). This is complicated by the variety of user controls that must be displayed by the SGP 42. Furthermore, the user can resize a window, pan, scroll, zoom, or make some change to the viewport. As the user does this, only an appropriate part of the smart graphics is displayed by the graphical user interface. This requires real-time changes in the location and amount of three-dimensional visuals that are displayed. In order to accomplish this, the VMM function 46 was created. The role of the VMM function 46 is to locally synchronize and coordinate the presentation of both the two-dimensional and three-dimensional information, so that a single, coordinated view is presented to the user.

In order to faithfully render a condition of the full-scope simulation instance 48, the client computer 22 must continuously send data generated by user interaction with the SGP 42, and information retrieved from the 3-D database 26 by the 3DV 44. The client computer 22 must likewise receive data from the simulation instance 48, and use that information to update the displays generated by each of the SGP 42 and 3DV 44 On the client computer 22 side, the information exchange with the simulation server 28 is handled by a data control and provision 60, which coordinates data communications with a counterpart data control and provision function 50 on the server 28. The data control selects a data provision function to track data element subscriptions, as will be explained below with reference to FIG. 5, used by the SGP 42, to write data to, and read data from, a shared memory 56 used by the 3DV 44.

Figure 3:
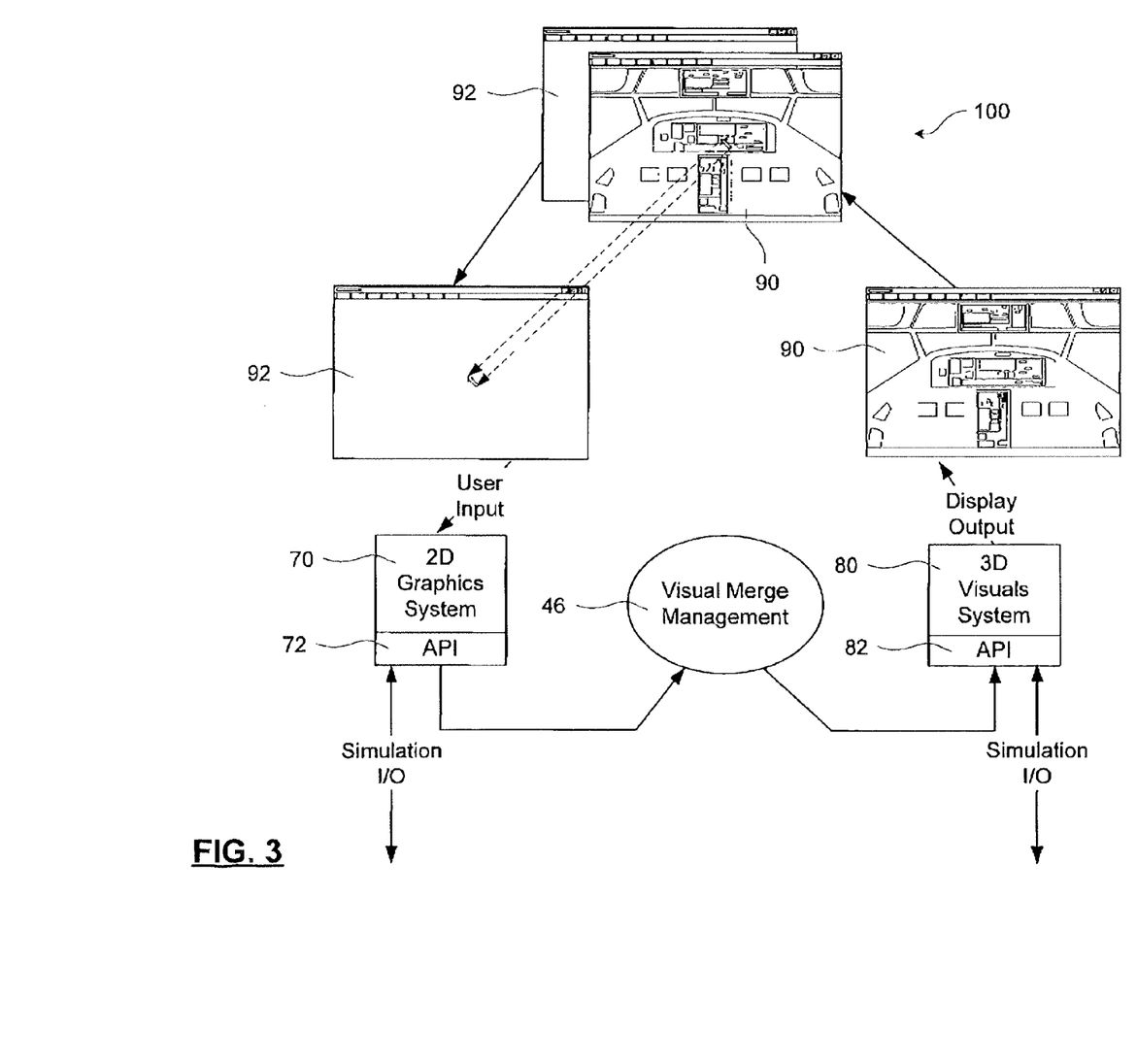
FIG. 3 is a schematic diagram of overview of an implementation of a user interface in accordance with one embodiment of the invention.

FIG. 3 provides an overview of the high fidelity visual display in accordance with the invention. A two-dimensional graphics system 70 includes an application program interface (API) 72 through which the data control and provision function 60 (FIG. 2) moves simulation input/output data, as explained above. The VMM 46 also uses the API 72 for retrieving bitmap data and window size information used to control a merged visual image 90, as will be explained below in more detail. Likewise, a three-dimensional visual system 80, which has an API 82 used by the data control and provision 60 and the VMM 46. As will be explained below in more detail, the two-dimensional graphics system 70 generates a two-dimensional user interface window 92, which is conveniently blanked since it is always positioned behind the display window. The two-dimensional graphics system 70 also generates a bitmap image, conveniently stored in an off-screen buffer 110 (see FIG. 4). The function of the bitmap image and its associated changes are important. The bitmap is used as a mask to show only the appropriate portions of the three-dimensional visuals generated by the three-dimensional visual systems 80. The user views only those three-dimensional visuals that are not masked by the bitmap stored in the off-screen buffer 110. As will be explained below in more detail with reference to FIG. 7, a bitmap can be thought of as an opaque mask consisting of color attributes (Red, Green and Blue). By defining a single chroma-key (a unique color), in a manner known in the art, the bitmap mask can be modified so that areas which are to be transparent are assigned the chroma-key color attribute. This modified bitmap is then converted to a texture, which is used by the texture mask assembler 116 in the three-dimensional visual system 80 to create a texture mask, as will be explained below with reference to FIG. 4.

Figure 4:
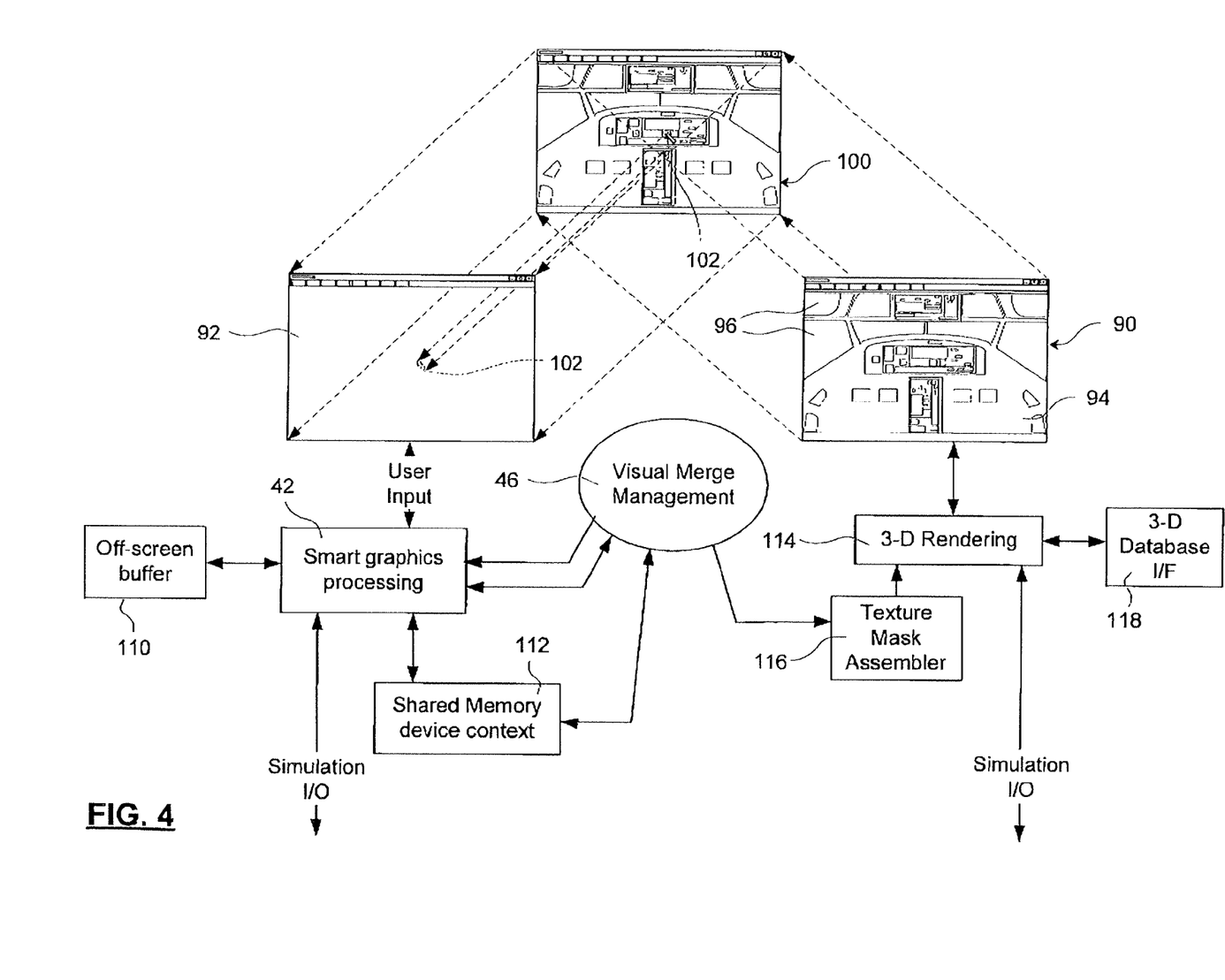
FIG. 4 is a schematic diagram providing a more detailed view of the user interface shown in FIG. 3.

The texture mask is translated into visual texture data that is applied to a full screen polygon at zero depth to the user. Consequently, the user views the three-dimensional visuals through the transparent portion(s) of the mask. Since the balance of the image 90 is the two-dimensional graphics derived from the bitmap, the effect is an integration of the previously separate two-dimensional and three-dimensional images, both of which are appropriately synchronized with the simulation instance 48.

FIG. 4 is a more detailed representation of the client computer 22 image processing functions shown in FIG. 3. The SGP 42 generates the bitmap image that is stored in the off-screen buffer 10. As will be explained below with reference to FIG. 5, the off-screen buffer 110 must be updated each time any one of three events occurs. Namely, the user interacts with the smart graphics to change a condition of a virtual control displayed by the display window 100; the user performs a zoom, pan, scroll or resize operation on the display window 100; or input is received from the simulator instance 48 that requires that a displayed control panel be changed. When any one of those events occurs, the bitmap used to generate the texture mask must be changed, Consequently, each time the SGP 42 changes the off-screen buffer 110 that stores the bitmap, the SGP 42 notifies the VMM 46 of viewport changes and off-screen buffer updates. Consequently, the VMM function 46 sends the command to the SGP to copy the off-screen buffer to the shared memory device context. The VMM function 46 then performs the necessary coordination with the three-dimensional visual system 80 to effect corresponding changes in the high fidelity visual display window 90. In this embodiment, the VMM function 46 passes the new bitmap to the texture mask assembler 116, which converts the bitmap to visual texture data. The texture mask assembler then passes the visual texture data to a three-dimensional rendering process 114, which uses it to generate the high fidelity visual display window 90. As well, the window dimension and the field-of-view are forwarded by the VMM 46 to the visual system through the 3D visual system API (FIG. 3).

The three-dimensional rendering process is continuously receiving input from the simulation instance 48, and reading visual system information from the three-dimensional database 26 (FIG. 2) using an three-dimensional database interface 118. The three-dimensional rendering process 114 converts the visual information into a three dimensional visual image that is overlaid with the texture mask created by the texture mask assembler 116 to generate the display window 90. Interpolation and extrapolation algorithms (dead-reckoning) predict and smooth some of the data (such as position and attitude information) received from the simulation, in a manner well known in the art. The display window 90 displays the texture mask 94 (in this example, an aircraft cockpit). Transparent areas 96 of the texture mask 94 display the three-dimensional visuals. The display window 90 is generated with user input functions disabled, in a manner known in the art. The display window 90 is then displayed over a window 92 that has user input functions enabled. The window 92 is optionally blanked, as explained above. The functional window 92 is controlled by the SGP 42, which accepts the user input events directed to the display window 100. The SGP coordinates user input events recorded by window 92 with smart graphics objects embedded in the bitmap image stored in the off-screen buffer 110.

Consequently, when the user manipulates a pointing device that controls a cursor 102, to change a control setting on a displayed control panel, the SGP 42 detects the event and determines a position of the cursor 102 on the enabled window 92. The SGP 42 determines what changes are required to the bitmap stored in the off-screen buffer 110, as well as what data, if any, must be sent to the simulation instance 48. It should be noted that a touch-sensitive display surface can be used in place of a pointing device, in which case a touch event is detected instead of the pointing device event described above.

Figure 5:
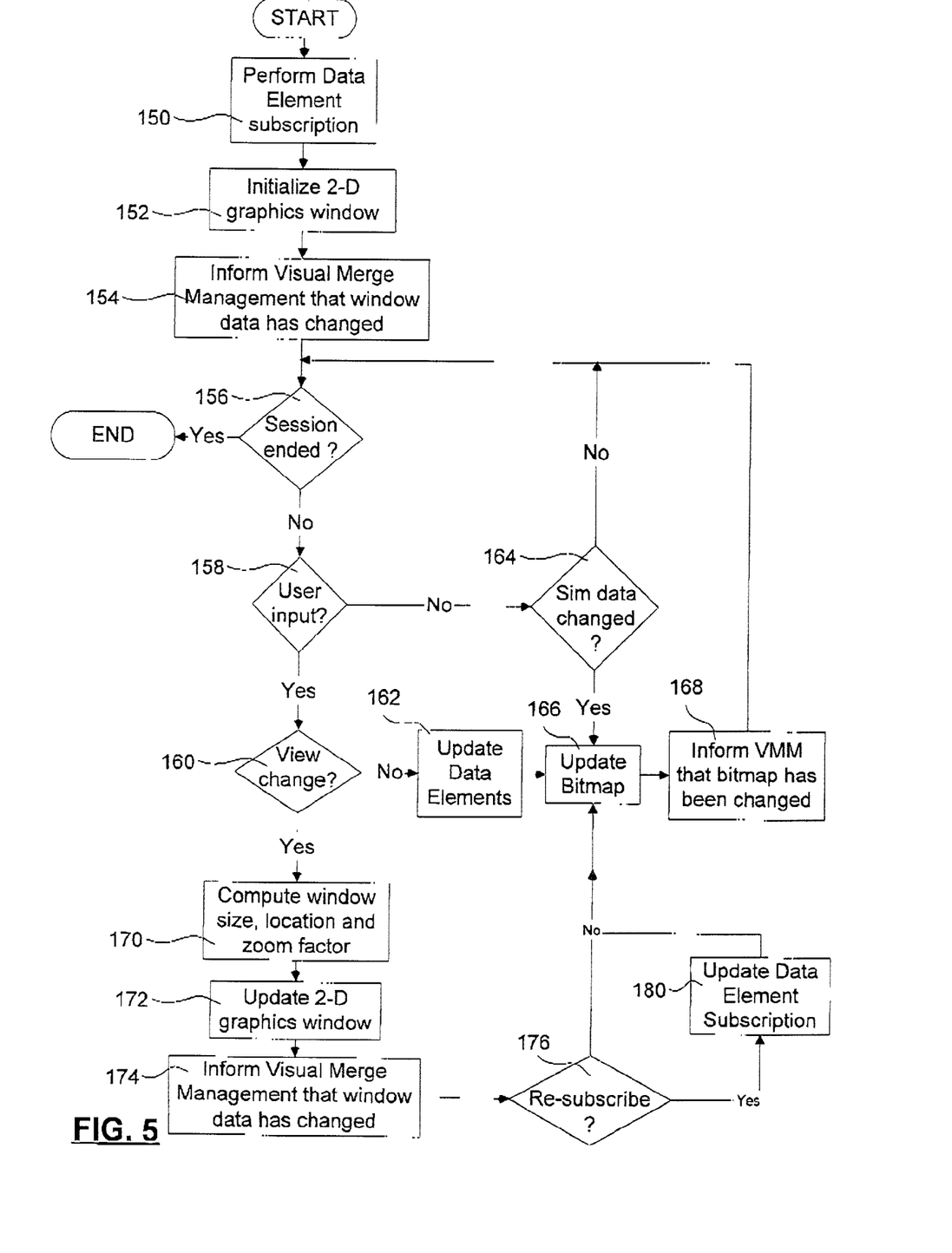
FIG. 5 is a flowchart showing principal logic used to drive the two-dimensional graphics system shown in FIG. 3.

FIG. 5 is a flowchart that shows the principal steps performed by the SGP 42 while performing methods in accordance with the invention. In an initialization phase, the SGP 42 performs data element subscription (step 150). As explained in applicant's above-referenced patent applications, in order to ensure efficient use of network 24 resources, only data relevant to a displayed part of the control panels of the simulated complex system is sent to, or received from, the simulation instance 48. Consequently, a data element subscription process is performed. During the data element subscription process, the SGP 42 registers with the data control and provision function 60 all data elements associated with smart graphics displayed by a default start-up view of the control panel(s). After the data element subscription process is completed, the SGP 42 initializes a two-dimensional graphics window 92 and generates a bitmap that is stored in the off-screen buffer 110 (step 152). Upon VMM 46 requests, the SGP 42 copies the bitmap to the shared memory device context controlled by the VMM 46 (step 154). Then, the VMM coordinates the bitmap processing with the 3DV 80, as described above, In step 156, the SGP 42 determines whether the current session has ended. If so, the SGP 42 terminates and garbage collection ensues, in a manner well known in the art. Otherwise, the SGP 42 checks a user input register (step 158) to determine whether there has been input from the user. If user input is detected, the SGP 42 determines (step 160) whether the input has resulted in a change of view (resize, pan or zoom operation). If not, the user input has changed a state of one of the displayed smart graphics, so the SGP 42 determines which data element(s) must be updated (step 162) to advise the simulator instance 48 of the change of state. If it was determined in step 158 that there was no user input, the SGP 42 checks (step 164) to determine if any of the subscribed data elements have been changed by feed back from the simulation instance 48. If none of the data elements have been updated by the simulation instance 48, the process loops back to step 156.

The bitmap stored in the off-screen buffer 110 must be updated, regardless of whether the data elements have been updated by user input (step 162) or by feed back from the simulator instance 48 (step 164). Consequently, the bitmap is updated in step 166, and the new bitmap image is passed to the VMM 46 (step 168).

If it was determined in step 160 that the user input resulted in a change of view (resize, pan or zoom operation), the smart graphics processing 42 computes a new window size, location and zoom factor (step 170) and updates the window 92 (step 172). The new window data is then sent to the VMM 46 when requested by the latter (step 174). It is then determined (step 176), whether the change of view requires a change in the subscription to any of the data elements. If so, all data elements that have been excluded by the change of view are un-subscribed to, and any newly required data elements are subscribed to (step 180). In either case, the bitmap is updated (step 166) and sent to the VMM 46 (step 168), as described above.

Figure 6:
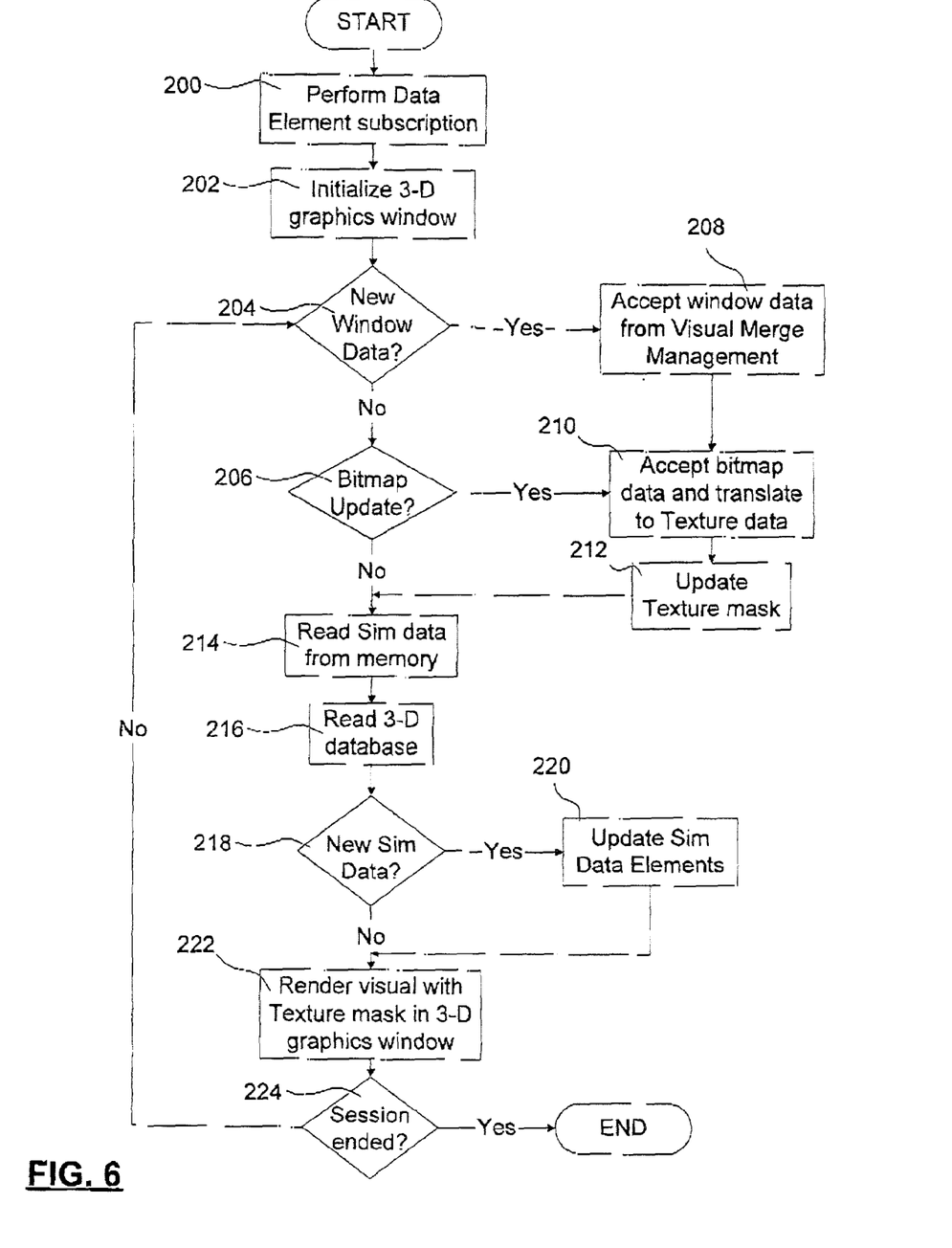
FIG. 6 is a flowchart showing principal logic used to drive the three-dimensional visual system shown in FIG. 3.

FIG. 6 is a flowchart that illustrates an overview of the logic used in the 3DV 44 to perform the methods in accordance with the invention. The process begins with an initialization of the window 90. The 3DV 44 relies on simulator input for location, attitude, and many other simulated system dependent variables to generate the three-dimensional visuals displayed in the window 90. Likewise, as will be explained below in more detail, the three-dimensional database 26 may contain data elements that must be communicated to the simulation instance 48. Consequently, system initialization begins with a data element subscription process (step 200), as explained above with reference to FIG. 5. The 3DV 44 then initializes the window 90 to display a default view (step 204) and checks to determine whether new window data has been received from the VMM 46 (step 204), If new window data has not been received, the 3DV 44 determines whether the VMM 46 is requesting a bitmap update (step 206), If a bitmap update is required, the bitmap is accepted from the VMM (step 210) and passed to the texture mask assembler 116, which converts the bitmap to a texture mask, as will be explained below with reference to FIG. 7. Likewise, if it is determined in step 204 that new window data (window size, position, scroll or zoom factor) is available from the VMM 46, the window data is accepted from the VMM 46 in step 203 and the updated bitmap is accepted (step 210) and passed to the texture mask assembler 116. In either case, the new texture mask is generated by the texture mask assembler 116 (step 212), so that the display window 90 displays the correct texture mask over the three-dimensional visuals.

In step 214, the subscribed data elements are read from the shared three-dimensional memory 56 (FIG. 2), because those data elements may be required to set up a retrieval of information form the three-dimensional database 26 required for a next iteration of the three-dimensional visuals component of window 90. Information is then read from the three-dimensional database 26 (step 216), in a manner well known in the art. After the data retrieval, it is determined in step 216 whether the data retrieval returned any data elements that must be passed back to simulator instance 48. For example, the three-dimensional database may contain information about approaching objects, changes in elevation, obstructions, or other information required by the simulation instance 43 to update instruments, raise alarms, etc. If data element values were retrieved from the three-dimensional database 26, those data element values are written to the three-dimensional shared memory 56 in step 220. Otherwise, the 3DV 44 renders the visual for window 90 by overlaying the three-dimensional visuals with the texture mask, as will be explained below in more detail with reference to FIG. 7. In step 224, it is determined whether the session has ended. If it has not, the process reiterates from step 204. The quality of the 3DV is optimized by running at approximately 60 Hz; however, in order to reduce processing load on the client computer the 3DV can run at lower refresh rates. Additionally, in order to reduce processing load on the client computer 22, the SGP 42 described above with reference to FIG. 4 preferably iterates at about 5 Hz, which provides a high fidelity simulation.

Figure 7:
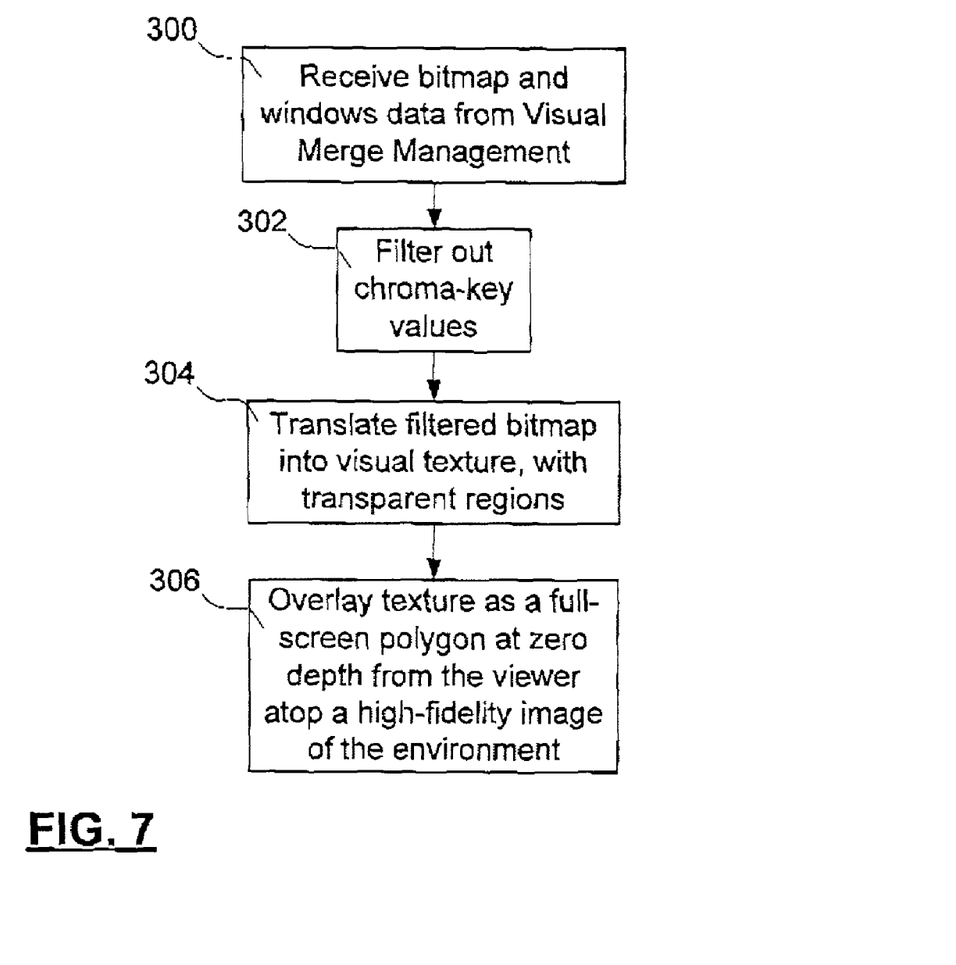
FIG. 7 is a flowchart showing the principal logic used to create or update a texture mask used to display the user interface shown in FIGS. 3 and 4.

FIG. 7 is a flowchart showing principal steps in the processing of bitmap data to generate the visuals for the window 90 displayed by the 3DV 44. In step 300, the 3DV 44 receives a new bitmap, which may be accompanied by new window data, from the VMM 46, as explained in detail above. The new bitmap is passed to the texture mask assembler 116, which filters out the chroma-key values (step 302), as described above, and translates the remainder of the bitmap image to visual texture data (step 304). The visual texture data may include transparent regions, be completely transparent, in a manner known in the art, or be completely opaque, dependent on the point of view. The texture mask assembler 116 then passes the texture mask data to the three-dimensional rendering process 114 (FIG. 4), which overlays the texture as a full-screen polygon at zero depth to the viewer atop a high-fidelity image of the environment created using the data retrieved from the three-dimensional database 26, as described above.

Figure 8:
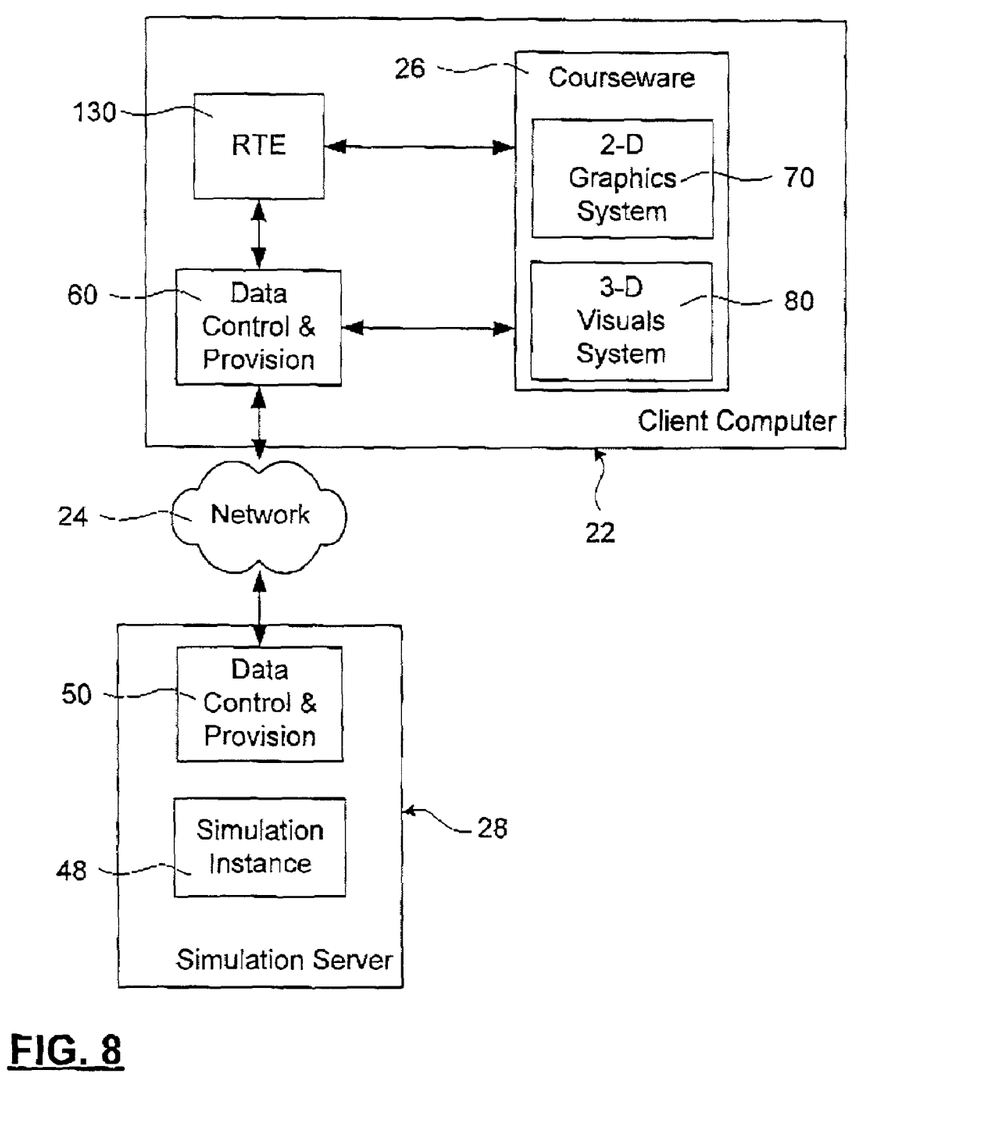
FIG. 8 is a schematic diagram of another embodiment of a client/server architecture that can be used to implement the system in accordance with the invention.

FIG. 8 is a schematic diagram of another embodiment of a system 20 in accordance with the invention, in which a client computer 22 is used as a training device that employs self-paced courseware as a training aid, as described in applicant's above-referenced co-pending patent applications. The system 20 includes the simulation server 28 connected to the client computer 22 through network 24. As explained above, the client computer 22 connects to a simulation instance 48 of the simulation server 28 through data control and provision functions 50.

The client computer 22 includes the data control and provision functions 58, 60 described above. It also includes a run time engine (RTE) 130, used to drive the courseware 26, as described in applicant's co-pending patent applications. The courseware 26 is integrated with and functions in concert with both the two-dimensional graphics system 70 and the three-dimensional visual system 80. For example, the courseware 26 may generate text boxes that are integrated into the bitmap image passed by the VMM 46 from the two-dimensional graphics system 70 to the three-dimensional visual system 80. The courseware may also be used to introduce visual effects or visual highlights into the display output of the three-dimensional visual system 80. For example, if the complex system is an aircraft, the courseware may illustrate a recommended approach path to a runway using a visual indicator displayed in the window 90. Likewise, obstacles or hazards may be highlighted or indicated with a visual marker, or the like. Consequently, the integrated courseware can be used for a number of important training and practice applications.

The invention therefore provides an important tool, when combined with courseware, that permits a rapid advance in the training of integrated procedures, and the acquisition of systems knowledge and operator skills related to the operation or maintenance of any simulated complex system. The system in accordance with the invention permits distance learning and skills practice from a remote location with all of the attendant benefits of a full-scope simulation with high fidelity visuals, including a fully functional control interface that faithfully duplicates the appearance and functionality of a control panel of the real system. The system in accordance with the invention is useful in an unlimited number of applications, since it provides all of the benefits of a full-scope simulator, except for the motion and immersive physical environment.

The embodiment(s) of the invention described above is(are) intended to be exemplary only. The scope of the invention is therefore intended to be limited solely by the scope of the appended claims.

We claim:

1. A system for providing a high-fidelity visual display coordinated with a full-scope simulation instance of a complex system, the system comprising smart graphics processing that generates a two-dimensional image of displayed control panels of the simulated complex system, the two-dimensional image including embedded smart graphics that translate user input events representing user manipulations of virtual controls associated with the displayed control panels into data elements that are sent to the full-scope simulation instance, three-dimensional visuals processing for generating the high fidelity visual display using visual environment data, and a visual merge management function that synchronizes and coordinates the two-dimensional image and the three-dimensional visuals to present a single, coordinated view to the user, and the full-scope simulation instance is fully coordinated with the high fidelity visual display by exchanging data between the smart graphics processing, the three-dimensional visuals processing and the full-scope simulation instance to determine when a change to the single coordinated view presented to the user is required.

2. The system as claimed in claim 1 further comprising a high-fidelity three-dimensional database for dynamic modeling of an environment in which the complex system operates, the database providing the visuals environment data to the three-dimensional visuals processing.

3. The system as claimed in claim 1 wherein the three-dimensional visuals processing exchanges data with the full-scope simulation instance, so that the full-scope simulation instance is responsive to the visual environment data, and the three-dimensional visuals processing is coordinated with the full-scope simulation instance in real time.

4. The system as claimed in claim 1 further comprising courseware adapted to facilitate the learning of system knowledge and procedures by the user of the system.

5. The system as claimed in claim 1 wherein the smart graphics processing further stores the two-dimensional image in an off-screen buffer and maintains a shared memory device context for tracking the smart graphics associated with the two-dimensional image to enable translation of the user input events into changes to data element values that are supplied to the full-scope simulation instance.

6. The system as claimed in claim 5 wherein the smart graphics processing udates the two-dimensional image in response to a user input event that changes a viewport that displays the high-fidelity visual display.

7. The system as claimed in claim 6 wherein the visual merge management function communicates and coordinates changes in the two-dimensional image to the three-dimensional visuals processing.

8. The system as claimed in claim 7 wherein the visual merge management function receives window data and bitmap updates, and forwards the window data and the bitmap updates to the three-dimensional visuals processing.

9. The system as claimed in claim 8 further comprising a texture mask assembler adapted to receive the bitmap updates, and to convert the bitmap to a texture mask.

10. The system as claimed in claim 9 wherein three-dimensional processing generates the high-fidelity visual display by overlaying the texture mask on a three-dimensional image generated using the visual environment data.

11. The system as claimed in claim 10 wherein the smart graphics processing and the tree-dimensional visuals processing each dynamically subscribe to data elements used to exchange data with the instance of the full-scope simulation.

12. The system as claimed in claim 11 wherein the smart graphics processing changes its data element subscriptions each time a change to the two-dimensional image results in a change to smart graphics embedded in the two-dimensional image.

13. The system as claimed in claim 1 wherein the client computer further comprises courseware for providing training in any one of systems knowledge, integrated procedures, and skills required to operate or maintain the complex system.

14. A method of providing training and practice on a simulated complex system for personnel who are to operate or maintain the complex system, comprising:
generating a two-dimensional image of displayed control panels of the simulated complex system, the two-dimensional image including embedded smart graphics processing that translates user input events representing user manipulations of virtual controls associated with the displayed control panels into data elements that are sent to a full-scope simulation instance of the complex system;
generating a high fidelity visual display using three-dimensional visuals processing which processes visual environment data and a visual merge management function that synchronizes and coordinates the two-dimensional image and the three-dimensional visuals to present a single, coordinated view to the user; and
coordinating the high fidelity visual display with the full-scope simulation instance of the complex system by exchanging data between the smart graphics processing, the three-dimensional visuals processing and the full-scope simulation instance to determine when a change to the single coordinated view presented to the user is required.

15. The method as claimed in claim 14 further comprising retrieving the visual environment data from a database local to a client computer that performs the steps of generating and coordinating.

16. The method as claimed in claim 15 further comprising simulating the complex system using the instance of the simulation that runs on a remote server.

17. The method as claimed in claim 16 further comprising subscribing to data elements for exchanging data with the instance of the simulation to permit an exchange of data with the instance of the simulation using the data elements, in order to transfer the inputs generated by the manipulation of the virtual controls by the personnel to the instance of the simulation, and to receive feed back from the instance of the simulation for updating the two dimensional image.

18. The method as claimed in claim 16 further comprising subscribing to the data elements for exchanging data with the instance of the simulation, to permit an exchange of data with the instance of the simulation using the data elements, in order to transfer information retrieved from the visual environment database to the instance of the simulation and to coordinate the high fidelity visual display with a condition of the instance of the simulation.

19. The method as claimed in claim 14 wherein generating the two-dimensional image further comprises modifying the two-dimensional image so that areas that are to be transparent are assigned a chroma-key color attribute, and storing a bitmap image in a memory of the client computer.

20. The method as claimed in claim 19 further comprising transferring the bitmap image to three-dimensional visuals processing, which is responsible for generating the high fidelity visual display, each time the smart graphics is changed.

21. The method as claimed in claim 20 further comprising filtering the chroma-key values from the bitmap image and converting the bitmap image to three-dimensional texture data used by the three-dimensional visuals processing to create the texture mask.

22. The method as claimed in claim 20 further comprising providing courseware on the client computer for training the personnel in any one of systems knowledge, integrated procedures, operator skills, and maintenance skills required to operate or maintain the complex system.

23. The method as claimed in claim 22 further comprising associating courseware with learning management system records and tracking mechanisms for the purpose of granting training credits and complementing a course curriculum.

24. The method as claimed in claim 23 further comprising downloading any one of courseware, smart graphics objects and three-dimensional databases based on curriculum requirements determined by a learning management system.

25. A complex system training and practice apparatus, comprising a client computer provisioned with smart graphics processing adapted to generate a two-dimensional image of displayed control panels of the simulated complex system, the image including embedded smart graphics that translate user input events representing user manipulations of virtual controls associated with the displayed control panels into data elements that are sent to a full-scope simulation instance of the complex system, and three-dimensional visuals processing for generating a high fidelity visual display using visual environment data representing an environment in which the simulated complex system is operated, and combining the high fidelity visual display with the two-dimensional image for display on a display surface of the client computer, and an interface for permitting the client computer to communicate and exchange simulation data with a server computer that operates the full-scope simulation instance that simulates the complex system.

26. The apparatus as claimed in claim 25 wherein the client computer further comprises a database for storing the visual environment data.

27. The apparatus as claimed in claim 26 wherein the client computer further comprises a texture mask assembler for converting the two-dimensional image into visual texture data used by the three-dimensional visuals processing as a texture mask to generate the high fidelity visual display.

28. The apparatus as claimed in claim 27 wherein the three-dimensional visuals processing applies the textures mask to a full screen polygon at zero depth to a user, and the user views the high fidelity visual display of the environment through transparent areas of the texture mask.

29. The apparatus as claimed in claim 28 wherein the smart graphics processing generates the two-dimensional image with a chroma-key color attribute assigned to selected areas that are to be transparent, and the texture mask assembler converts the two-dimensional image to a texture mask with transparency in the selected areas.

30. A computer readable medium containing computer executable program instructions, comprising:
program instructions for smart graphics processing that generates a two-dimensional image of displayed control panels of a simulated complex system, the two-dimensional image including embedded smart graphics that accept user input events that represent user manipulations of virtual controls associated with the displayed control panels and translate the user input events into data elements that are sent to a full-scope simulation instance of the simulated complex system;

program instructions for three-dimensional visuals processing that generates a high fidelity visual display using visual environment data representations of an environment in which the simulated complex system is operated, and a visual merge management function that synchronizes and coordinates the two-dimensional image and the three-dimensional visuals to present a single, coordinated view to the user;

program instructions for providing the full-scope simulation instance of the complex system that is fully coordinated with the high-fidelity visual display by exchanging data between the smart graphics processing, the three-dimensional visuals processing and the full-scope simulation instance to determine when a change to the single coordinated view presented to the user is required.

31. The computer readable medium as claimed in claim 30 further comprising program instructions for providing the visual merge management function, which accepts the two-dimensional image and display window data from the smart graphics processing, passes the two-dimensional image and display window data to the three-dimensional visuals processing, and coordinates generation of the high fidelity visual display.

32. The computer readable medium as claimed in claim 30 further comprising program instructions for converting the two-dimensional image into a three-dimensional texture data.

33. The computer readable medium as claimed in claim 32 further comprising program instructions for filtering out regions of the two-dimensional image to provide transparent areas in the three-dimensional texture data through which the high fidelity visual display of the environment can be viewed.

34. The computer readable medium as claimed in claim 33 further comprising program instructions for applying the texture data to a full screen polygon laid over the high fidelity visual display at zero depth to a user, to permit the user to view the high fidelity visual display of the environment through the transparent areas of the texture data.

35. The computer readable medium as claimed in claim 30 further comprising courseware program instructions for training students in any one of systems knowledge, integrated procedures, operator skills, and maintenance skills required to operate or maintain the complex system.

* * * * *